E. LEHR.
UNIT SWITCH CONTROL SYSTEM FOR ELECTRIC MOTORS.
APPLICATION FILED JUNE 8, 1907.
992,217. Patented May 16, 1911.
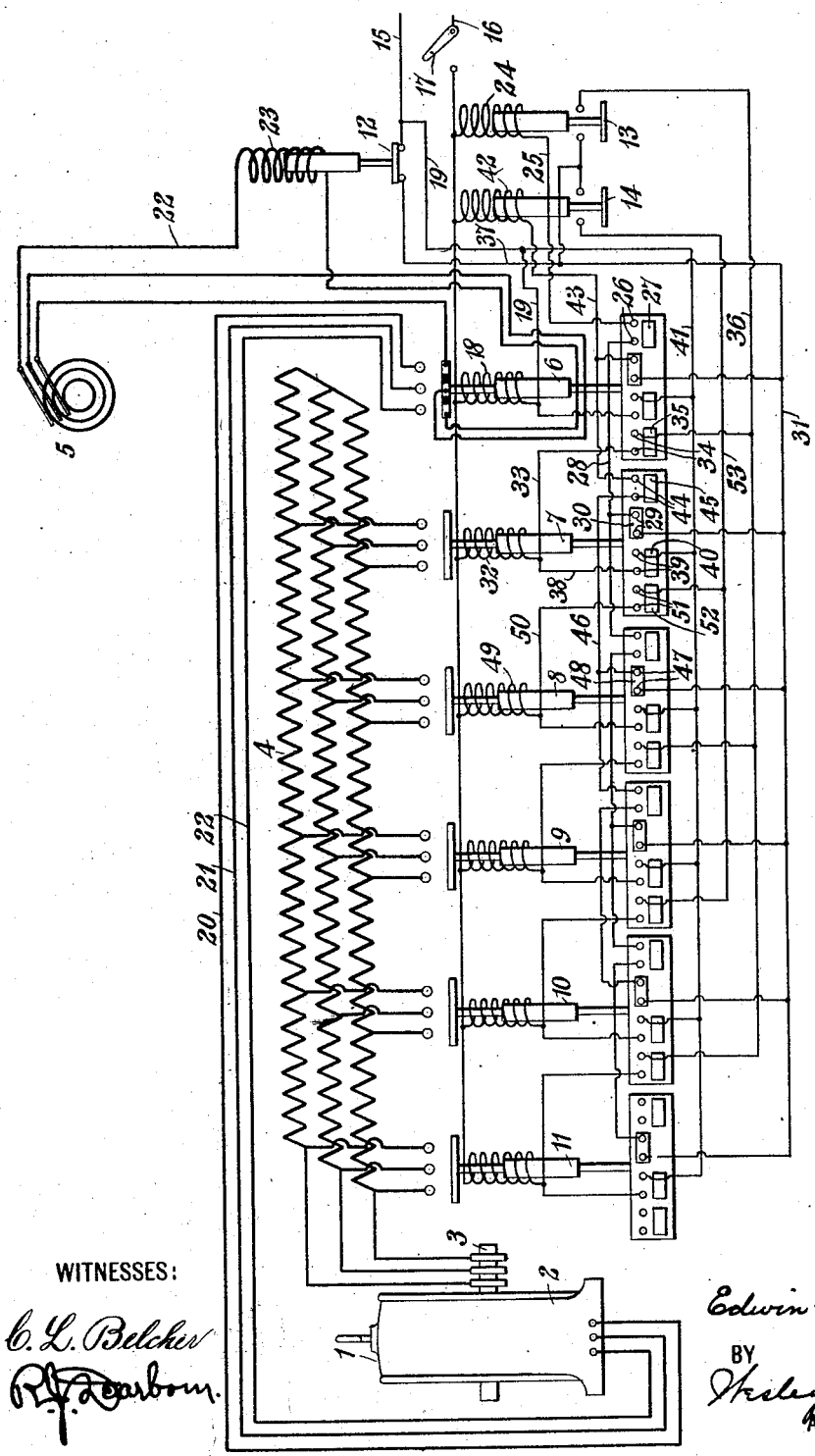
WITNESSES:
C. L. Belcher
R. J. Dearborn.
INVENTOR
Edwin Lehr
BY
Wesley G. Carr
ATTORNEY

UNITED STATES PATENT OFFICE.

EDWIN LEHR, OF WILKINSBURG, PENNSYLVANIA, ASSIGNOR TO WESTINGHOUSE ELECTRIC & MANUFACTURING COMPANY, A CORPORATION OF PENNSYLVANIA.

UNIT SWITCH-CONTROL SYSTEM FOR ELECTRIC MOTORS.

992,217.   Specification of Letters Patent.   Patented May 16, 1911.

Application filed June 8, 1907. Serial No. 377,924.

*To all whom it may concern:*

Be it known that I, EDWIN LEHR, a citizen of the United States, and a resident of Wilkinsburg, in the county of Allegheny and State of Pennsylvania, have invented a new and useful Improvement in Unit Switch-Control Systems for Electric Motors, of which the following is a specification.

My invention relates to systems of electric motor control and it has for its object to provide a system of this class comprising a plurality of independently operated switches that are specially adapted for governing the secondary resistances of induction motors.

In starting a relatively large induction motor, it is desirable to connect a suitable resistance in its secondary circuit. As the speed of the motor increases, this resistance may be gradually short-circuited, unless it is specially designed for regulating the motor speed.

According to my present invention, I provide a plurality of independently operated switches for controlling the secondary resistance of such a motor: a series relay switch and intermediate relay switches being provided for delaying the closure of the control switches.

The single figure of the accompanying drawings, is a diagrammatic view of a control system arranged in accordance with my invention.

Referring to the drawing, an induction motor 1 having a stationary member 2, a rotatable member 3 and a secondary resistance 4, is supplied with alternating current energy from a three-phase source 5. The circuit connections for the motor and its resistance are controlled by switches 6, 7, 8, 9, 10, and 11 that are governed by a series relay switch 12 and intermediate relay switches 13 and 14. The control switches are electrically operated and are supplied with energy from a control circuit 15—16 through a single point master switch 17.

Although a three-phase motor is illustrated and although the control switches are electrically operated, my invention is, of course, not restricted in this regard and it is conceivable that various modifications may be effected in the arrangement of the circuits without departing from the spirit of my invention.

Assuming that the switches occupy the positions shown in the drawing; if the master switch 17 is closed, energy will be supplied from control line conductor 16 through the switch 17, an operating magnet winding 18 of the switch 6 and conductor 19 to the opposite control line conductor 15. When the coil 18 is energized, the switch 6 is closed and energy is supplied to the motor from the generator 5 through line conductors 20, 21, and 22 and the switch 6.

The relay switch 12 is provided with an operating magnet winding 23 which is connected in series with line circuit 22 and, consequently, the control circuit is opened when the current traversing the motor circuit exceeds a predetermined amount. The magnet winding 23 is preferably designed in such a manner that the switch is closed under normal operating conditions of the motor and, since, in starting an induction motor, the current becomes abnormally great for a short time, this limit switch will be temporarily opened. As soon as the motor speed has increased and the switch 12 is closed, a control circuit is established from conductor 16 through an operating magnet winding 24 of the relay switch 13, conductor 25, contact members 26 (which are bridged by contact member 27 when the switch 6 is closed), conductor 28, contact members 29 (which are bridged by a contact member 30 when the switch 7 is open), conductor 31 and the relay switch 12 to the line conductor 15. Relay switch 13 may now be closed, provided switches 6 and 12 are closed and switch 7 is open.

The closure of the relay switch 13 completes an operating magnet circuit for closing the switch 7 as follows: from conductor 16, magnet winding 32 of the switch 7, conductor 33, contact members 34 (which are bridged by a contact member 35 when the switch 6 is closed), conductor 36, relay switch 13, conductor 37 and limit switch 12 to the opposite line conductor 15. The switch 7 is thus closed and a portion of the resistance 4 is short circuited, such action being delayed by the closure of the relay switch 12 and the relay switch 13. As soon as the switch 7 is closed, another circuit is established from the operating magnet winding 32 through conductor 38, contact members 39 (which are bridged by contact member 40), and conductors 41 and 19, to the conductor 15, so that switch 7 is held in this position, independently of the subsequent action of the limit or relay switches. Following the closure of the switch 7, a circuit is also established through an operating magnet winding 42 of the relay switch 14, conductor 43, contact members 44 (which are bridged by a contact member 45), conductor 46, contact members 47 (which are bridged by a contact member 48, when the switch 8 is open), conductors 31 and 37 and the switch 12 to the line conductor 15. The contact member 30 moves out of engagement with the contact members 29, so that the relay switch 13 is permitted to open at this point. The relay switch 14 is dependent upon the switch 8 being opened and the switch 12 being closed and it will be observed that the switch 8 is closed after the closure of the switch 14, a circuit being established from the conductor 16 through operating magnet winding 49 of the switch 8, conductor 50, contact fingers 51 (which are bridged by contact member 52, when the switch 7 is closed), conductor 53, switch 14, conductor 37 and switch 12 to the line conductor 15. In a similar manner, the switches 9 and 11 are dependent upon the closure of the relay switch 13, and the switches 8 and 10 are dependent upon the closure of the relay switch 14. By this means, the action of the switches is delayed not only until the switch 12 is closed but also until either one or the other of the switches 13 and 14 is closed.

The proper sequence of operation for the switches 6 to 11, inclusive, is insured by the interlocking of their circuits in conjunction with their intermediate relay switches 13 and 14.

The switches 7 to 10, when closed, successively short-circuit a greater portion of the resistance 4 and finally the switch 11 short-circuits the entire resistance.

During the automatic acceleration of the motor, the control switches are sometimes closed in such rapid succession that the series relay switch does not have time to delay their closure. In such cases, if the closing circuit of a control switch is once interrupted and the holding circuit closed, the switch will remain in a closed position, but, if the series relay acts after the switch has started to close and before its closing circuit is interrupted, an arc will be formed at the terminals of the series relay switch which will be amplified by the inductance in the switch magnet windings.

One of the principal advantages of my invention lies in the fact that the intermediate relay switches 13 and 14 are so designed and connected in circuit that they automatically delay the closure of the successive control switches until the series relay has had time to act, provided the conditions in the motor circuit are such as to energize the magnet winding 23 of the series relay.

Having thus described my invention, what I claim and desire to secure by Letters Patent, is:

1. In a control system, the combination with an electric motor, a supply circuit therefor, a resistance for the motor and a plurality of independently operated resistance-controlling switches, of a series relay switch and a pair of intermediate relay switches that alternately coöperate with the series relay switch to delay the action of the resistance-controlling switches.

2. In a control system, the combination with an electric motor, a supply circuit therefor, a resistance for the motor and a plurality of independently operated resistance-controlling switches, of a limiting device, and intermediate relay switches for delaying the action of the resistance-controlling switches, each resistance-controlling switch being dependent upon the limiting device and one of the intermediate relay switches.

3. In a control system, the combination with an induction motor having primary and secondary members, a resistance for the secondary and a plurality of independently operated resistance-controlling switches, of a limit switch and a pair of intermediate relays for delaying the action of the resistance-controlling switches.

4. In a control system, the combination with an induction motor having primary and secondary members, a resistance for the secondary member, a plurality of independently operated resistance-controlling switches, and an independent control circuit, of a limit switch operated by the motor current and relay switches governed by the limit switch and acting alternately to delay the action of the successive resistance-controlling switches.

5. In a control system, the combination with a plurality of control switches adapted to close in a predetermined sequence, of a series-relay switch and plurality of intermediate relay switches that alternately delay the action of the successive control switches to permit the series-relay switch to act after each control switch is closed.

6. In a control system, the combination with a plurality of control switches adapted to close in a predetermined sequence, of a series-relay switch and a pair of intermediate relay switches that alternately act in conjunction with the series-relay switch to delay the closure of the successive control switches.

7. In a control system, the combination with a plurality of independently operated control switches adapted to close in a predetermined sequence, of a series relay switch and intermediate relay switches which alternately delay the closure of the successive control switches and insure normal operation of the series-relay switch.

8. In a control system, the combination with an induction motor having primary and secondary windings, a resistance for the secondary circuit, a plurality of independently operated resistance-controlling switches having actuating magnet windings, and an independent supply circuit for the actuating magnets, of a series-relay switch, and intermediate relay switches coöperating therewith to delay the closure of the control switches, said intermediate relay switches being adapted to insure normal operation of the series-relay switch.

In testimony whereof, I have hereunto subscribed my name this 31st day of May, 1907.

EDWIN LEHR.

Witnesses:
   Ross W. Copeland,
   Birney Hines.